Patented Aug. 13, 1935

2,011,218

UNITED STATES PATENT OFFICE 2,011,218

FABRIC CEMENT

Ludwig V. Glomb, Jamaica, N. Y., assignor to Britex Awning Cloth Co., Inc., Richmond Hill, N. Y., a corporation of New York No Drawing. Application October 3, 1932, Serial No. 636,096

1 Claim. (Cl. 134—17)

This invention relates to a composition of matter and in particular to a liquid cement to be used in the joining of fabrics and the like which has definite advantages over cement in present day use for like purposes.

A particular object of my invention is to use as a cement, a water emulsion of rubber known as "latex", which is a product of the rubber tree and contains a normal amount of water and which may be diluted or concentrated as desired. This latex constitutes the main ingredient of my improved cement but may be mixed with other ingredients to render it impervious to dust, provide a neutral color and maintain its adhesive quality.

My fabric cement therefore, consists essentially of latex, as previously defined, to which may be added, although not necessary, a small percentage of resin varnish, a deodorizing oil or agent and a water soluble dyestuff. The latex retains flexibility and acts as adhesive in joining the fabrics together. The varnish adds to the wearing qualities and removes tackiness so that the cement does not catch dust. As an example, oil of citronella may be used as a deodorizing oil or agent in sufficient quantity to give this cement a distinctive odor, in this instance, nigrosine B solution, is employed as a color neutralizing agent so that the cement, in drying, is a neutral color and may thus be adapted to any colored material, it being understood that with the use of my improved cement, sewing of awnings, tents, and other fabrics is eliminated and by using a neutral coloring agent, plain, woven or striped awning material may be matched up so that the point of connection is practically unnoticeable. The cement does not damage any surface with which it comes into contact.

I have found that the best proportion of these different ingredients is as hereinafter noted but my invention is not to be limited to precisely the ingredients nor to the quantities thereof noted:

|                     | Parts  |
|---------------------|--------|
| Rubber latex        | 10     |
| Resin varnish       | 1      |
| Oil of citronella   | 1/100  |
| Nigrosine B solution| 1/100  |

It is to be distinctly understood that the resin varnish, citronella and the nigrosine B solution may be dispensed with or that the oil of citronella and the nigrosine B solution may be replaced by other deodorizing agent or water soluble dyestuff, as desired, without affecting the scope of my invention.

The nigrosine B solution is composed of one ounce of nigrosine B crystals and one gallon of distilled water.

In compounding my cement, the resin varnish, the deodorizing oil or agent and the water soluble dyestuff is added to the latex, the finished product being thin enough to get into the pores of the fabric and hold securely.

The advantages derived from the use of my cement is the fact that it is non-inflammable and contains no high volatile solvent, therefore rendering the cement practically non-evaporating and permitting longer working time which gives the worker a chance to do better and cleaner work. My improved cement can be applied directly to hot awnings exposed to the sun without having its adhesive properties impaired and can also be used in weather of high humidity or dampness without blushing.

Further, the product is non-congealing and with continued opening of the receptacle in which it is stored, does not gum up and all of the product may be used.

When my cement is applied, it forms a tough, waterproof, flexible, weatherproof film between the layers of material cemented together and when dry retains the flexibility of the material and is powerful enough to bind the materials together so that under strain, the materials themselves, would rupture before the points of adhesion would separate.

My fabric cement in addition to providing a waterproof, flexible and durable patch is easy to apply and rubs off the hands easily and cleanly. For best results and permanent work, the cement is applied to both parts that are to be joined. The parts are then stuck together and allowed to stand for twenty minutes or more to set before putting to use thus making a live, flexible connection that does not become brittle with age. The cement may be used on the finest silks or the heaviest cotton duck and it is particularly adapted for use in connection with awnings, tents, tarpaulins, truck covers, upholstery, umbrellas, seat cushions, rugs, carpets and all kinds of fabrics in general.

Having thus described my invention, the details of which I do not desire to be limited, what is claimed as new and what is desired to be secured by Letters Patent is set forth in the appended claim.

What I claim is:

A fabric cement consisting of rubber latex 10 parts, resin varnish 1 part, a deodorizing agent of oil of citronella 1/100th part and a color neutralizing agent of nigrosine B solution 1/100th part.

LUDWIG V. GLOMB. [L. S.]